Nov. 18, 1958    R. G. MOREAU ET AL    2,861,192
CONTOUR FOLLOWER APPARATUS

Filed Feb. 15, 1955    4 Sheets-Sheet 1

INVENTORS
R. G. Moreau
M. M. G. DeLattre
By Glascock Downing Diebold
ATTYS.

INVENTORS
R. G. Moreau
M. M. G. Delattre
ATTYS.

Nov. 18, 1958  R. G. MOREAU ET AL  2,861,192
CONTOUR FOLLOWER APPARATUS
Filed Feb. 15, 1955  4 Sheets-Sheet 4
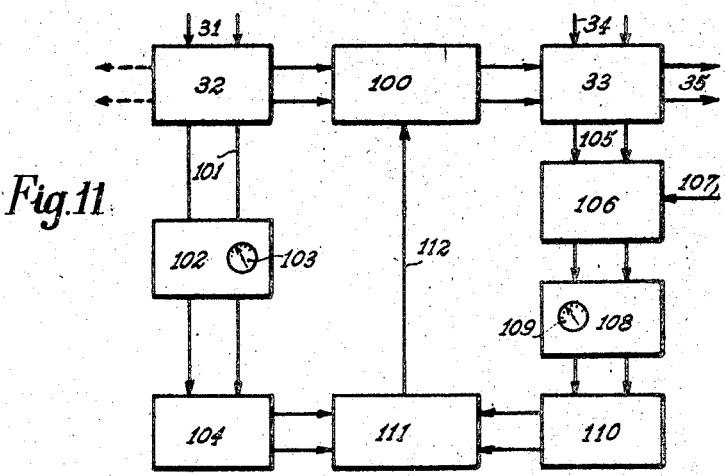
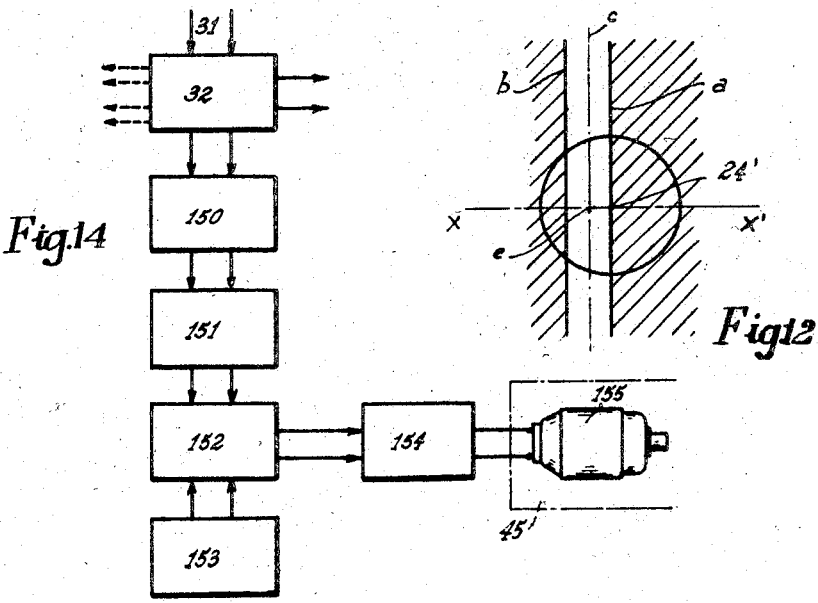
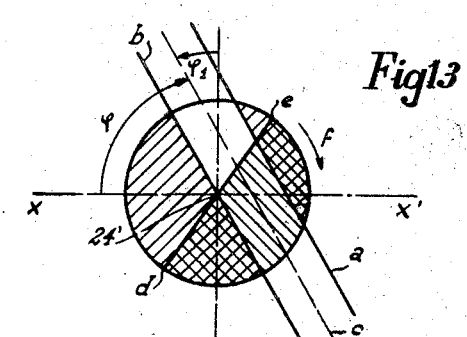
INVENTORS
R. G. Moreau
M. M. G. Delattre
By [signature]
ATTYS.

United States Patent Office 2,861,192
Patented Nov. 18, 1958

2,861,192

CONTOUR FOLLOWER APPARATUS

Roland G. Moreau, Paris, and Michel M. Gérard Delattre, Vincennes, France, assignors to Office National d'Etudes et de Recherches Aeronautiques, Chatillon-sous-Bagneux, France, a corporation of France Application February 15, 1955, Serial No. 488,376

Claims priority, application France February 16, 1954

12 Claims. (Cl. 250—202)

The invention relates to contour or pattern follower apparatus and to a machine embodying such apparatus.

It is an object of the invention to provide apparatus adapted automatically to follow a predetermined contour or pattern.

It is a related object of the invention to provide such apparatus possessing extreme accuracy, that is, one that will follow the prescribed contour or pattern with very low error.

It is also an object to provide such apparatus that will continue to operate satisfactorily even in case of variations in the strength of the input energy thereto.

Another object is to provide such apparatus which will be easy to operate, will not be liable to misadjustment once it has been adjusted and will thus be suitable for use in an engineering workshop.

It is a further object of the invention to provide a machine equipped with an apparatus of the above kind and thereby adapted to impose upon a tool a path of motion which will be an exact replica of a desired graphic contour.

It is a related object to provide such a machine which will be operative to reproduce graphic contours of irregular form, differing greatly from the more usual and simple geometrical forms, to permit machining of "skew" parts with a degree of precision not attainable heretofore.

A further object is to provide a copying machine usable in the manufacture of parts including portions having extremely low radii of curvature.

According to the invention, the contour to be copied is defined by means of a luminous pattern line against a dark background and this line is scanned by an optico-electronic device mounted on a movable carriage or the like, which device is adapted to respond to variations in the quantity of light received by it from the line, and to the position of a reference mark of said device with respect to a center line of the streak, and to deliver an output signal which is applied to power means operative to move the carriage in a direction to restore a symmetrical relationship between the luminous line and said reference mark.

Further according to the invention, the optico-electronic device embodies a revolving interceptor disc coaxial with the above mentioned reference mark of the device and acting as a light-modulator to modulate the beam of light issuing from the luminous pattern line.

An advantage of the invention lies in the automatic elimination of the objectionable effects inherent to a certain lack of precision in the pattern contour. The "pilot" means is provided by the virtual, or ideal, line forming the statistical or mean axis of symmetry with respect to the physical boundary lines defining the luminous pattern line, which ideal line does not embody the imperfections present in said physical lines. This feature makes the system particularly advantageous in cases where the contour to be copied is obtained by a photographical developing process.

In the ensuing description, made by way of illustration, reference is made to the accompanying drawings wherein:

Fig. 9 is a block diagram illustrating a modified embodiment of the invention;

Fig. 11 is a diagrammatic illustration of a portion of an improved system;

Fig. 12 is a large-scale diagram indicating a distribution of light;

Fig. 13 is similar to Fig. 12, but for another slope of the contour;

Fig. 14 is a general diagrammatic illustration of another improvement.

Figure 1:
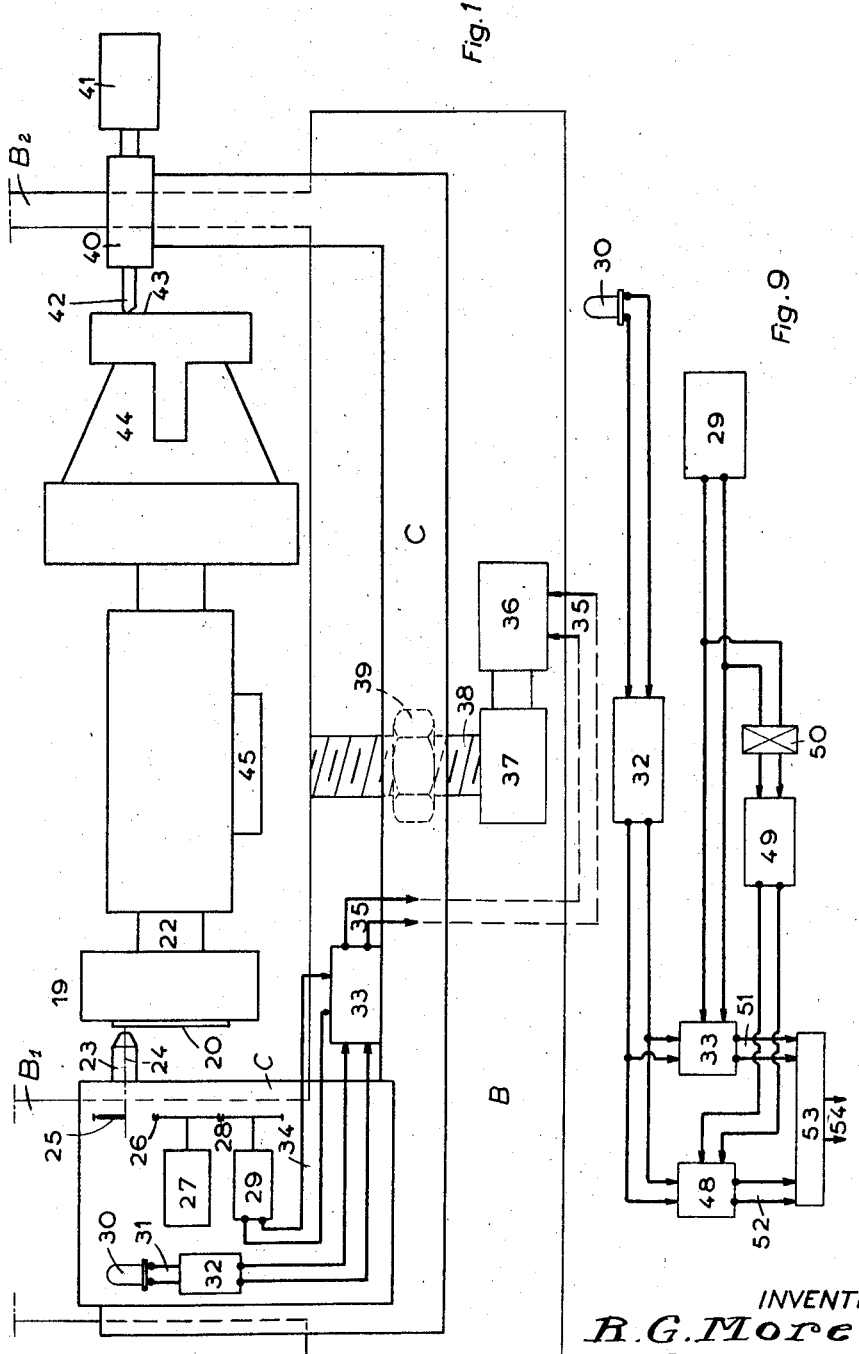
Fig. 1 is a general diagrammatic illustration of the system.
Figure 10:
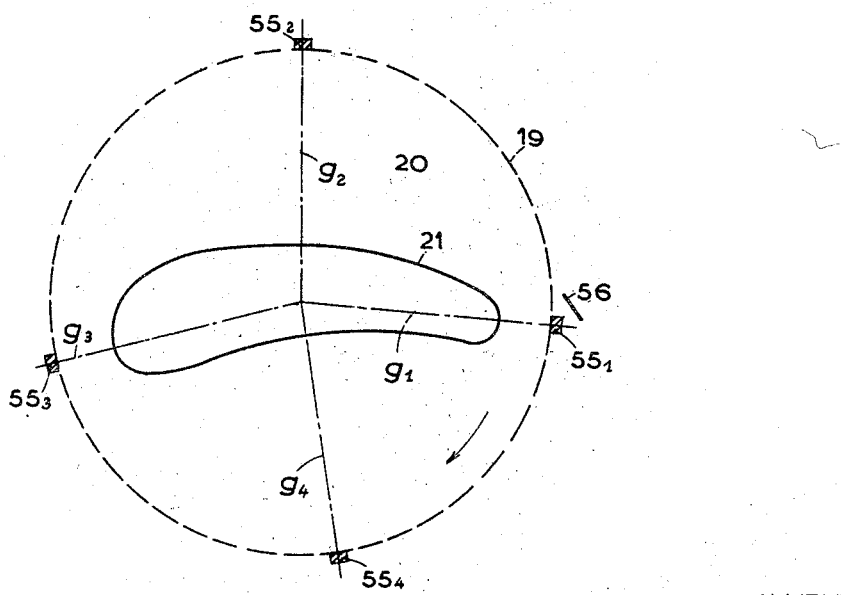
Fig. 10 is a diagrammatic front view of the light casing.

Reference is first made to Fig. 1. The apparatus there shown comprises a light casing 19 arranged to illuminate from within a photographic plate or wall 20 upon which the contour to be copied materializes as a luminous line 21 (see Fig. 10) clearly visible against a black background. According to a modified form of the invention, the contour to be copied may be materialized as a black line against a transparent wall illuminated from the rear. The light casing is secured on a shaft 22 so as to be driven in rotation therewith. Disposed adjacent to the plate 20 is the input to a microscope unit 23 having its optical axis 24 directed normally to said plate.

The microscope unit 23 is mounted on a carriage C mounted for sliding movement on a fixed frame B. Located behind or beyond the microscope unit is a semi-circular rotatable interceptor member 25 rotatable about an axis coincident with the optical axis 24 of the microscope. The semi-circular member 25 is at least equal in diameter to the diameter of the circular illuminated field of the microscope. The semi-circular member 25 is driven through gearing 26 from an electric motor 27 supported on the frame C, said motor being further arranged, through gearing 28, to drive an A.-C. generator 29.

The light beam traversing the microscope unit 23 is cyclically intercepted by the semi-circular member 25 and falls on a photo-sensitive cell 30 which delivers an electric output signal which is led off through conductors 31 and passed through a suitable amplifier 32; the amplified signal is then fed to a phase discriminator circuit 33 which is further supplied through leads 34 with the A.-C. voltage generated by generator 29. The amplifier 32 is a variable-gain amplifier wherein the gain is varied in response to frequency, in such a way as to be a maximum for a frequency corresponding to the speed of rotation of the semi-circular member 25, and zero for zero frequency (D.-C.). The output 35 from the phase discriminator is applied through a power amplifier to a reversible electric motor 36 supported on the fixed frame B and adapted through reducer gearing 37 to rotate a lead screw 38 in either one of two senses of rotation. The lead screw is mounted parallel to the slideways $B_1$, $B_2$ formed on the frame and having the carriage C mounted thereon, and said screw cooperates with a nut 39 secured on carriage C. To permit such cooperation the carriage C may be displaced in either direction along the ways $B_1$, $B_2$ so that during such displacement the intersection or trace of optical axis 24 upon the plane of plate 20 will move on a radial line passing through the intersection or trace of the center line of shaft 22. Secured on carriage C is a tool-carrier 40 having a traversing motor 41 associated with it. The tool 42, e. g. a milling cutter, mounted on carrier 40 engages the workpiece 43 secured in workcarrier chuck 44. The chuck 44 is secured on the shaft 22 of the light-casing; shaft 22 is adapted to be rotated by means of a suitable power device indicated at 45.

Figure 2:
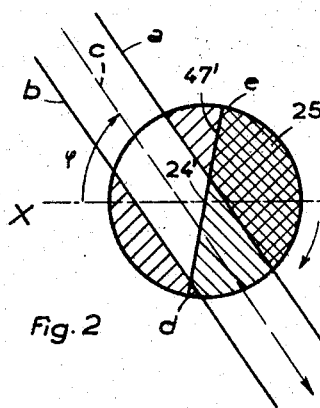
Fig. 2 is a large-scale diagram indicating the distribution of light beyond the microscope unit.

Referring to Fig. 2, the axis X—X' represents the projection upon a transverse sectional plane through the light beam between interceptor member 25 and photo-sensitive cell 30, of the path of displacement of the microscope unit 23, during the sliding displacement of the carriage C supporting said unit, with respect to frame B. The boundary lines $a$ and $b$ define the projection of the luminous pattern line upon the same sectional plane. With a field diameter, as measured on the plane containing the pattern, of about the same order of magnitude as the width of the pattern line (in practice said field diameter may be three or four times greater than said width), the lines $a$ and $b$ within the field may be considered as rectilinear. Actually it is found that the apparatus will operate successfully even if at each point of the pattern line the radius of curvature is three or four times greater than the radius of the circle defining the field. The lines $a$ and $b$, and the center line $c$ thereof, form an angle $\varphi$ to the axis X—X', wherein $\varphi$ may vary from 0 to $\pi$, if the center line $c$ and the axis are oriented in the manner indicated by the arrows on the figure. It may be assumed that the semi-circle 25' which corresponds to the interceptor member 25, concentric with the projection 24' of axis 24, is rotated for example in the sense indicated by the arrow "$f$," at the angular rate $\omega t$. In the instance illustrated in Fig. 2, the projection 24' lies to the left of the center line $c$, as seen by an observer placed along said line and looking in the direction of the arrow. The amount Q of light impinging on the photo-cell 30 can then be represented by the curve I in Fig. 3, which is a graph wherein the abscissae are the rotational angles of the interceptor member 25 as counted from an initial position corresponding to the position wherein the projection $d$—$e$ of the straight edge 47 of the interceptor member 25 is directed on the line X—X', the point $e$ being directed towards the X side. The curve I resembles in general trend a sine curve. A maximum amount of light falls on the photo-cell 30 as the edge $d$—$e$ is parallel to the direction of the center line $c$, with the point $d$ towards the arrow. A minimum quantity of light reaches the photocell 30 for a position of the disc 25 displaced an angle $\pi$ (i. e. 180°) from the maximum position just specified.

Figure 3:
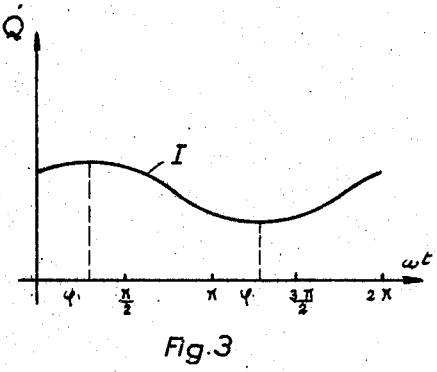
Fig. 3 is a corresponding graph.
Figure 4:
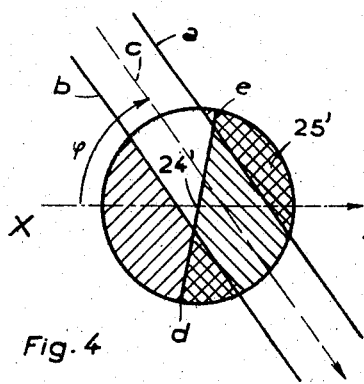
Fig. 4 is similar to Fig. 2 in another condition of the system.
Figure 5:
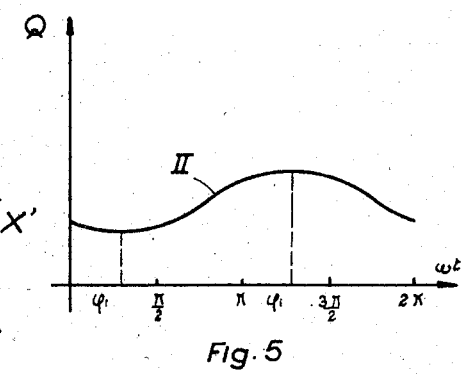
Fig. 5 is similar to Fig. 3 in the same condition as Fig. 4.

Figs. 4 and 5 are respectively similar to Figs. 2 and 3 except that they relate to the case where the trace 24' of the optical axis of the microscope lies to the other side of the center line $c$ as compared to the foregoing instance. The representative curve of the amount of light falling on photo-cell 30 is then as illustrated at II. This curve also is generally sinusoidal, but its minimum occurs when the interceptor member 25 assumes the position in which said amount of light was a maximum in the case previously described, while its maximum occurs for the angular position of member 25 in which said amount was a minimum.

Figure 6:
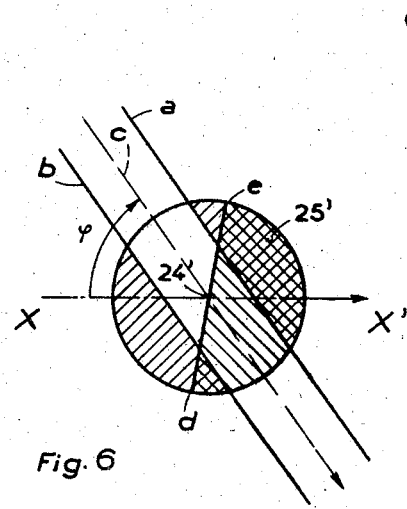
Fig. 6 is similar to Figs. 2 and 4 in yet another condition.
Figure 7:
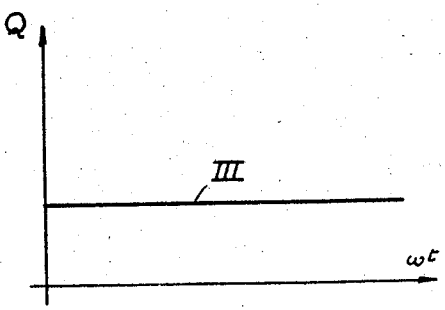
Fig. 7 is similar to Figs. 3 and 5 in the same condition as Fig. 6.

Figs. 6 and 7 are respectively analogous to Figs. 2 and 3, and to Figs. 4 and 5, but deal with the instance where the projection 24' lies on the center line $c$. In this case the amount of light reaching the photo-cell is constant regardless of the position of the interceptor member 25, and the representative curve is the horizontal line III.

Figure 8:
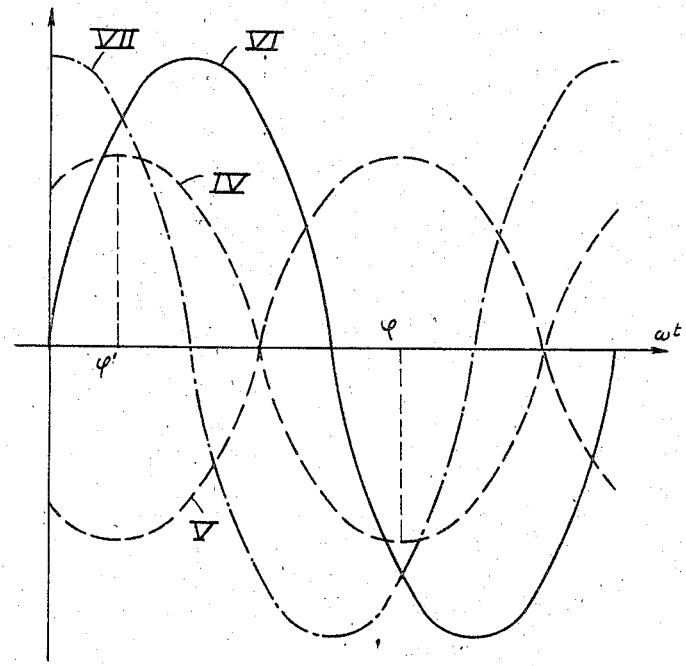
Fig. 8 is an explanatory graph.

The output signal from variable-gain amplifier 32 having maximum response for a frequency corresponding to the rate of rotation of interceptor member 25, may be represented, in case of an input according to curve I, by the curve IV of Fig. 8, which approximates a sinusoid, and possesses a maximum for a value approximating $\varphi$ max., and differs therefrom by the phase shift introduced by the amplifier.

For an input in accordance with curve II on the other hand, the output voltage from amplifier 32 is as represented by curve V. Curve V is a quasi-sinusoidal curve identical with curve IV except that it is displaced therefrom by a phase angle $\pi$.

In other words there is obtained across the output of amplifier 32 an alternating voltage of a fixed frequency but of one or the opposite phase condition according as the conditions are those defined in connection with Fig. 2 or in Fig. 4, that is, according as the trace of the microscope optical axis lies to one or the other side from the center line $c$ of the luminous pattern line.

When this output voltage is fed to phase discriminator 33 which is simultaneously supplied with a reference voltage as represented by the curve VI delivered by A.-C. generator 29, there is obtained across the discriminator output a D.-C. voltage of one or the other polarity depending on whether the prevailing conditions are as in Fig. 2 or in Fig. 4. This D.-C. voltage signal is amplified in a power amplifier and applied to the motor 36 to rotate the motor and thereby, through reducer 37 and screw-and-nut drive 38—39, displace carriage C relatively to frame B in such a direction that in either of the above specified cases the trace 24' will be moved towards the center line of the pattern line. With reference to the copying machine tool assembly described hereinabove, the rotary axis of milling cutter 42 will reproduce the contour 21.

The invention likewise contemplates an improved embodiment wherein the output signal from amplifier 32 is applied to a further discriminator 48 in addition to the previously mentioned discriminator 33. This further discriminator is supplied with a reference voltage derived from A.-C. generator 29 but passed through a reversing device 50 followed by a phase-shift circuit 49 introducing a phase displacement of $$\frac{\pi}{2}$$

The outputs of discriminators 33 and 48 are led through conductors 51 and 52 to a mixer device 53 adapted to add the voltages fed into it, and the output therefrom is fed by means of leads 54 to motor 36. The reverser 50 is operated by means of contacts $55_1$, $55_2$ etc. (see Fig. 10) spaced about the light casing 19 and arranged to cooperate with a fixed contact 56. The contacts $55_1$, $55_2$ are disposed on the ends of radii $g_1$, $g_2$ . . . which are normal to the luminous curve 21 and extend through the trace of the axis of rotation of casing 19 upon the plate 20 on which the luminous curve is formed. The arrangement and connections are such that each time a contact 55 is engaged by the contact 56 the output from generator 29 is shifted by a phase angle of $\pi$.

The voltage represented by curve IV may be expressed by the following expression:

$$m \cos (\omega t - \varphi')$$

wherein:

$$\varphi' = \varphi + \epsilon$$

wherein $\epsilon$ is the phase shift introduced by amplifier 32 and $m$ is a function of the displacement between trace 24' and center line $c$.

The voltage represented by curve V may be written as follows:

$$m \cos (\omega t - \varphi' + \pi)$$

The reference voltage represented by curve VI is given by the following expression:

$$A. \sin \omega t$$

The output voltage from discriminator 33 may be expressed by the following formula, wherein the quantity between // should be taken in absolute value:

$$\pm /k.\ A.\ m\ \sin\ \varphi'/$$

The sign of this quantity depends on which side of the middle line $c$ the trace of the optical axis lies, while its absolute value is a function of the distance between said trace and said middle line.

The reference voltage applied to the discriminator 48 is represented by curve VII (Fig. 8) and can be expressed as $$A.\ \sin\left(\omega t - \frac{\pi}{2}\right)$$

and the output voltage from discriminator 48 as $$k.\ A.\ m\ \cos\ \varphi'$$

This voltage corresponds to a condition of the reverser switch such that $$0 < \varphi' < \frac{\pi}{2}$$

The output from mixer device 53 is then represented by:

$$k.\ A.\ m\ (\sin\ \varphi' + \cos\ \varphi')$$

If $$\frac{\pi}{2} < \varphi' < \pi$$

the operation of reverser switch 50 will cause the discriminator 48 to be supplied with a reference voltage displaced $\pi$ from the phase condition prevalent in the foregoing case, so that the output of discriminator 48 then is:

$$-k.\ A.\ m\ \cos\ \varphi'$$

$\cos\ \varphi'$ being then negative. The output of device 63 is:

$$k.\ A.\ m\ (\sin\ \varphi' + \cos\ \varphi')$$

In either case, therefore, the main discriminated voltage output from first discriminator 33 the sign of which indicates which side—left or right—from the center line $c$ the optical axis lies and corresponding in magnitude with the spacing from said trace to said center line, has added to it a complementary voltage which always retains a positive sign. This complementary voltage enables the motor 36 always to be energized with a sufficient voltage even in case of a decrease in the main voltage, that is, in case $\varphi'$ approaches zero. The switching operation imposed on the reference input for discriminator 48 by operation of device 50 is made operative as said input approaches zero magnitude, so that it will not create any objectionable disturbances.

As a net result, the energizing voltage applied to motor 36 will be a voltage varying substantially proportionally to the displacement between trace 24' and means line $c$, and having one or the other sign in accordance with the direction of said displacement, and such as to ensure satisfactory energization of the drive motor under any of the various conditions that may arise.

Initially, when it may be required to shift the trace of the optional axis into the range of the luminous contour, this may either be effected by rotating the light casing 19 about its axis or by bodily shifting the microscope device including its optical transfer means, by direct manual action or by displacement of the carriage C supporting the device. The following procedure may be followed: Motor 36 is first disengaged from its automatic control means described hereinabove, then the microscope device is shifted along its longitudinal displacement axis by manual means. When as a result of such traverse the optical axis has been brought closely adjacent to the light contour, the motor is reconnected with its automatic operating means. Then the power device 45 actuating the light casing 19 is started. A few moments after the beginning of the resulting displacement the light contour is caused to intersect the optical axis of the microscope.

At that instant a signal appears at the output of the photo-sensitive cell and the apparatus thereupon operates to hold the trace of the optical axis within the luminous line by the process disclosed hereabove.

In the form of embodiment disclosed in Fig. 9, means are provided whereby the discriminating operation yielding the actuating signals in response to the phase condition of the output signal from the photo-cell will proceed satisfactorily even in the event of a variable inclination of the contour with respect to the direction of displacement of the pick-up unit.

A feature of the invention relates to the provision of means whereby the input control factor applied to the discriminator will also remain substantially independent of such inclination.

In accordance with this feature, there is interposed between the pick-up unit proper and the phase discriminator a variable gain amplifier wherein the gain is automatically varied as a function of such inclination.

It is to be noted that the feature just specified is equally applicable to the form of embodiment illustrated in Fig. 1, just as it is applicable to the embodiment shown in Fig. 9.

In the embodiment according to Fig. 11, the output signal from amplifier 32 is applied to discriminator 33 through an amplifier 100 wherein the gain is at all times controllable by the application to said amplifier of an electric control factor such as a D.-C. voltage. The said output signal moreover is applied through a channel 101 to a further amplifier 102 the gain of which is manually adjustable, e. g. through the control means diagrammatically indicated at 103. The amplifier 102 is followed by a rectifier 104 across the output of which there is delivered a D.-C. signal $S_1$. Moreover, the output signal from the discriminator 33, utilized in the channel 35 for controlling the motor driving the carriage C which carries the pick-up device, is simultaneously applied through a channel 105 to a modulator 106 where said signal serves to modulate a carrier wave applied over the channel 107. The modulated carrier is passed through a second amplifier 108 provided with means for manually adjusting the gain thereof, e. g. by the control member indicated at 109; then the amplified modulated signal is fed to a rectifier 110. The output signal $S_2$ from the rectifier 110 is applied together with signal $S_1$ to a comparing or subtracting device 111 which provides an output voltage representing the difference $S_1 - S_2$, and this differential voltage is applied over the channel 112 to the variable gain amplifier 100 as the gain controlling factor therefor.

The system described operates as follows: For initial adjustment the light casing 19 may be rotated to bring into registery with the pick-up device, a portion of the contour which is perpendicular to the displacement axis X—X' of said device; then the carriage C is displaced until the optical axis of microscope unit 23 intersects an edge of said contour portion, as illustrated in Fig. 12. After the system is started in operation, the gain of amplifier 102, and the gain of amplifier 108, are manually adjusted respectively, in such a way that the center line $c$ of the contour lies normal to the direction X—X', so that the output signals $S_1$ and $S_2$ respectively delivered by rectifier 104 and rectifier 110 are equal. Moreover, the gain of amplifier 100 is so selected that in the absence of any control factor applied thereto over the channel 112, the signal applied to discriminator 33 will have an amplitude such that the corrective action produced by it will have the greatest possible value consistent with the stability conditions for the system. During the normal operation of the system, as the contour becomes angled with respect to the direction X—X' of displacement of the carriage, for example in the position shown in Fig. 13, the amplitude of the signal delivered to the discriminator 33 (and consequently the corrective factor) will have the same values as previously, in the absence of the improved arrangement just described, whereas the distance which the carriage is required to travel in order to provide the total or full correction, has been increased: thus the accuracy of the system would be reduced. However, in accordance with the present improvement, even though the signal $S_1$ put out by rectifier 104 has retained the same value, the output signal $S_2$ has now diminished owing to the action of discriminator 33 which is now energized with a signal of different phase. Whereas the phase shift with respect to the reference voltage, supplied for example by A.-C. generator 29, was zero in the instance previously described, as will be evident from a consideration of Figs. 3, 5 and 8, said phase shift will now have the value $\varphi_1$, as indicated in Fig. 13; and the value of signal $S_2$ which is at all times proportional to sin $\varphi$ (with $$\varphi + \varphi_1 = \frac{\pi}{2}$$

is reduced correspondingly. Now the distance between 24' and $e$, which the carriage C will have to travel, is $$\frac{1}{\sin \varphi}$$

times greater than it was in the instance illustrated in Fig. 12. The system therefore achieves an automatic compensation and retains the same accuracy in operation regardless of the angling of the contour. In fact, the system will automatically adjust itself such that the difference $S_1 - S_2$ will be held to a very low value; any tendency of the angling of the contour to increase (i. e. movement of the contour away from normal relationship with the direction X—X') causes an increase in the amplitude of the signal applied to the discriminator, thereby simultaneously increasing the energization of the carriage drive motor, and increasing the signal $S_2$.

The invention further comprehends means for maintaining at a predetermined value the maximum error liable to be introduced by the system, and particularly holding said maximum error at a fixed value regardless of the angling of the contour with respect to the pick-up unit. For this purpose the invention provides for automatically adjusting the speed of rotation of the light casing as a function of the amplitude of the signal delivered by the pick-up unit.

The system illustrated in Fig. 14 comprises an amplifier 150 having its input connected to the output of amplifier 32 and adapted to have its gain adjusted by manual action. The output of amplifier 150 is connected to a rectifier 151 which delivers an output signal $S_3$ which in turn is applied to a comparison or subtractor device 152 having its other input supplied with a D.-C. voltage $S_4$, adjustable on initial adjustment of the system, and supplied by a battery or equivalent source 153. The voltage difference $S_4 - S_3$ forming the output of the subtractor 152 is fed to an amplifier 154 and the output from the latter energizes a scanning motor 155 forming part of the assembly 45.

This system operates as follows: Assuming the permissible error, as determined by the operating stability condition for the system, is say 2/100 of one millimeter, the pick-up unit is manually displaced until the point 24' is spaced 2/100 of a millimeter from the intersection of center line $c$ with the axis of displacement X—X' of the carriage C. The amplifier 150 is so adjusted that in this position the output signal from rectifier 151 is of such value as to cause the motor 155 to stop, at which time the voltage $S_3$ is equal, for example, to the reference voltage $S_4$. In the operation of the system, the scanning motor 155 will then slow down as soon as the error increases and the speed of rotation of the motor will approach zero as the error approaches the prescribed maximum error, so that such maximum error is never attained, the system operating to displace the pick-up unit in a sense to reduce the error and such displacement being always effected at a rate sufficient to make allowance for the variation in error due to the rotation of the contour, since the latter may approach zero. Thus, in particular, the error may be held down to a value less than a predetermined value regardless of the slope of the part of the contour being scanned, with respect to the axis of displacement of the pick-up unit.

The arrangement just described may, it will be noted, be applied simultaneously with that previously described with reference to Fig. 11. In this way, a system may be construed which will act to maintain the error less than a prescribed limit, while operating at rate consistent with practical requirements.

The invention further contemplates a modification according to which the automatic adjustment of the gain of the discriminator device, rather than being obtained by the means described with reference to Fig. 9, is obtained by means similar to those described in Fig. 11 in connection with the pick-up unit.

The compensating means illustrated in Fig. 9 in connection with the discriminator device, may also be applied to ensure automatic compensation for the gain of the pick-up unit.

What we claim is:

1. In a work shaping machine, the combination of a workpiece carrier, a tool operatively displaced relative to said carrier, a plan having a work shaping contour formed thereon by a tracing contrasted to the background of said plan, means for producing a light beam correlative to the contrast of said tracing to the said background, tracking means, including a microscope and a photo sensitive device for developing a signal in response to an incident light beam, a rotary modulator the operational boundary of which is symmetrical in relation to its rotational axis for cyclically interrupting said incident light beam at a predetermined rate, means for developing a control signal correlative to said interrupted incident light beam, a phase discriminator operatively connected to said control signal developing means for producing an unidirectional output signal having a polarity indicative of the phase relationship between said control signal and a reference signal, motor-generator means for driving said rotary modulator at said predetermined rate and for feeding a reference signal correlative to said rate to said phase discriminator, and coupling means operatively interposed between said workpiece carrier and said tool, said means including a bi-directional motor responsive to the polarity of said unidirectional output signal for effecting a displacement of said tool relative to said carrier correlative to the shaping contour on said plan.

2. In a work shaping machine according to claim 1 wherein said tool is a rotary cutter, and includes means for rotating said rotary cutter.

3. A work shaping machine comprising a fixed frame, a workpiece carrier disposed on said frame, means for rotating the workpiece carrier about an axis for shaping the work, a tool support having a tool disposed therein in operative relationship with said carrier for shaping the work, a slide carrying said tool support, means connected to said slide for effecting sliding thereof in a direction transversely of the axis of rotation of said carrier, an illuminated wall affixed to said workpiece carrier perpendicular to the rotational axis thereof, a double contrasted shaping tracing on said wall, a microscope disposed on said slide, said microscope having an optical axis parallel to the rotational axis of said workpiece carrier, a photocell operatively disposed behind said microscope and being influenced by the luminance incident on said microscope from said wall, a rotary light modulator the operative boundary of which is symmetrical in relation to its center of rotation mounted between said microscope and said photocell, motor means for rotating the modulator at a predetermined rate, a phase discriminator operatively connected to said photocell for producing a control signal correlative to the relationship of the output of said photocell to a reference signal, an A. C. source for driving the motor means at a predetermined rate and for furnishing said reference signal to said phase discriminator, bi-directional motor means operatively responsive to the polarity of said control signal thereby moving said slide in a direction dependent upon said polarity, and mechanical connecting means operatively interposed between said bi-directional motor means and said slide effecting the sliding thereof by said bi-directional motor means.

4. A work shaping machine according to claim 3 including an amplifier interposed between said photocell and said phase discriminator having a gain which is variable as a function of the inclination of said microscope relative to the direction of sliding of the portion of the tracing in the field of the slide.

5. A work shaping machine according to claim 3 including means for varying the rotational speed of said wall correlative to a control signal resulting from a comparison of the signal output of said photocell and of a reference signal.

6. A work shaping machine according to claim 3 including means for varying the rotational speed of said wall correlative to the amplitude of the output signal of said photocell.

7. A work shaping machine according to claim 3 and including an amplifier arranged between said light sensitive photocell and said phase discriminator the gain of which is adjustable in accordance with a control voltage applied thereto, means for amplifying the output signal from said photocell and for returning said amplified output signal, means for amplifying the control signal delivered by said discriminator, and means for comparing said amplified control signal with said amplified photocell output signal, the resultant signal from said comparison constituting said control voltage.

8. A work shaping machine comprising a fixed frame, a workpiece carrier arranged on said frame, means for rotating said workpiece carrier about an axis for shaping the work, a tool support having a tool disposed therein in operative relationship with said carrier for shaping the work, a slide carrying said tool support, means coupled to said slide for effecting sliding thereof in a direction transversely of the axis of rotation of said carrier, an illuminated wall affixed to said workpiece carrier perpendicular to the rotational axis thereof, a double contrasted shaping tracing on said wall, a microscope disposed on said slide and having an optical axis parallel to the rotational axis of said workpiece carrier, a photocell operatively disposed behind said microscope and developing an output signal in response to the luminance incident thereon from said wall, a rotatable light modulator mounted between said microscope and said photocell, electric motor means for rotating said modulator at a predetermined rate, an A. C. generator driven by said motor means for producing a reference signal correlative to said predetermined rate of driving said modulator, tuned amplifier circuit means for selectively amplifying said output signal when said output signal is of a frequency corresponding to said predetermined rate, phase discriminator circuit means coupled to said generator and to said tuned amplifier circuit means for producing a control signal having a polarity correlative to the relationship between said amplified output signal and said reference signal, bi-directional motor means operatively responsive to the polarity of said control signal for moving said slide in a direction dependent upon the polarity thereof, and mechanical means operatively connecting said bi-directional motor means and said slide for effecting sliding thereof by said bi-directional motor means.

9. A work shaping machine comprising a fixed frame, a workpiece carrier arranged on said frame, means for rotating said workpiece carrier for shaping the work, a tool support having a tool disposed therein in operative relationship with said carrier for shaping the work, a slide carrying said tool support, means coupled to said slide for effecting sliding thereof in a direction transversely of the axis of rotation of said carrier, an illuminated wall affixed to said workpiece carrier perpendicular to the rotational axis thereof, a double contrasted shaping tracing on said wall, a microscope disposed on said slide and having an optical axis parallel to the rotational axis of said workpiece carrier, a photocell operatively disposed behind said microscope for developing an output signal in response to the luminance incident thereon from said wall through said shaping tracing, a rotatable light modulator positioned between said microscope and said photocell for interrupting the luminance incident upon said photocell, electric means for rotating said modulator at a predetermined rate and for developing a potential reference signal, a tuned amplifier coupled to said photocell for selectively amplifying said output signal, a phase discriminator coupled to said tuned amplifier and to said electric means for developing a resultant signal correlative to said reference signal and said amplified output signal, first circuit means coupled to said tuned amplifier for developing a first D. C. signal having a polarity correlative to said amplified output signal, a carrier frequency signal source, a modulator coupled to said source and said discriminator for developing a modulated carrier signal correlative to said resultant and carrier frequency signals, second circuit means coupled to said modulator for developing a first D. C. signal having a polarity correlative to said modulated carrier signal, comparator circuit means for developing a control signal correlative to the difference between said first and second D. C. signals, an amplifier interconnecting said tuned amplifier and said discriminator and having an instantaneous gain proportional to said control signal thereby regulating the amplified signal fed to said discriminator, bi-directional motor means responsive to said resultant signal for moving said slide in a direction dependent upon said luminance incident upon said photocell, and mechanical means inter-connecting said slide and said bi-directional motor means for effecting sliding thereof by said bi-directional motor means.

10. A work shaping machine according to claim 9 wherein said electric means includes an electrical motor operatively coupled to said modulator, and an electrical generator adapted to be rotatably driven by said motor.

11. A work shaping machine according to claim 9 wherein said first and second circuit means each include an amplifier having a manually adjusted gain characteristic, and a rectifier coupled to the output thereof.

12. A work shaping machine according to claim 9, and including circuit means for regulating the speed of rotation of said illuminated wall at a rate proportional to the amplitude of the output signal of said photocell.

References Cited in the file of this patent

UNITED STATES PATENTS

| | | |
|---|---|---|
| 2,069,508 | Rutemiller et al. | Feb. 2, 1937 |
| 2,226,677 | Vikhman | Dec. 31, 1940 |
| 2,430,924 | Fowle et al. | Nov. 18, 1947 |
| 2,494,441 | Hillier | Jan. 10, 1950 |
| 2,513,367 | Scott | July 4, 1950 |
| 2,521,946 | Rathje | Sept. 12, 1950 |
| 2,713,134 | Eckweiler | July 12, 1955 |